United States Patent [19]

Inui

[11] Patent Number: 4,929,970
[45] Date of Patent: May 29, 1990

[54] LASER PRINTER
[75] Inventor: Koichi Inui, Higashiosaka, Japan
[73] Assignee: Sharp Kabushiki Kaisha, Osaka, Japan
[21] Appl. No.: 287,886
[22] Filed: Dec. 21, 1988
[30] Foreign Application Priority Data
Dec. 21, 1987 [JP] Japan .................. 62-324801
[51] Int. Cl.⁵ ............................................. G01D 15/00
[52] U.S. Cl. .................................. 346/160; 346/160.1
[58] Field of Search ............ 346/150, 153, 154, 160.1, 346/160, 76 L; 358/300, 302

[56] References Cited
U.S. PATENT DOCUMENTS
4,491,875 1/1985 Kawamura .......................... 358/298

FOREIGN PATENT DOCUMENTS
3516373 11/1985 Fed. Rep. of Germany .
3703035 8/1987 Fed. Rep. of Germany .
59-178467 3/1983 Japan ................................. 346/166

Primary Examiner—Arthur G. Evans
Attorney, Agent, or Firm—Irell & Manella

[57] ABSTRACT

A laser printer comprising a photoreceptive means, a laser beam emitting device, a detecting means for detecting a factor of degradation of the image quality, the factor originating in the photoreceptive means, and a control means which controls the output level of said laser beam emitting device in accordance with the detected level of said factor.

3 Claims, 3 Drawing Sheets

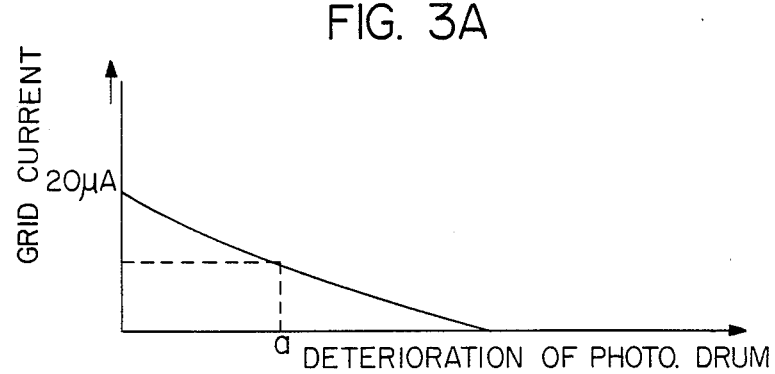
FIG. 3A
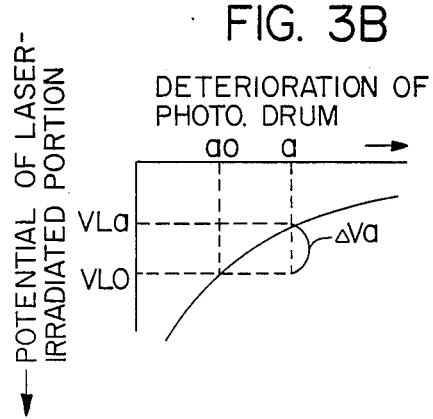 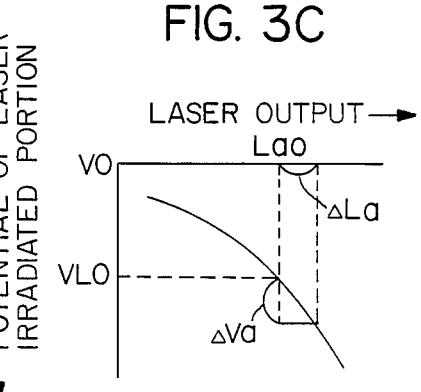
FIG. 3B
FIG. 3C

LASER PRINTER

BACKGROUND OF THE INVENTION

1. Field of the Invention

This invention relates to a laser printer. More particularly, it relates to an improved laser printer in which the degradation of the image quality attributable to a property of a photoreceptive means can be compensated.

2. Description of the Prior Art

A laser printers comprises a laser beam emitting device, and a photoreceptive means on which latent images are formed by irradiating a laser beam from the laser beam emitting device. The image quality of such a laser printer largely depends on the conditions of the photoreceptive means. The major causes of changing the conditions of the photoreceptive means include the deterioration of the photoreceptive means and the changes in temperature of the photoreceptive means. If the photoreceptive means deteriorates or its temperature changes from the normal conditions, the potential of a portion of the photoreceptive means irradiated by a laser beam (hereinafter, such a portion is referred as "a laser-irradiated portion") varies even when the optical output level of the laser beam is fixed at a constant value. The variation of the potential of a laser-irradiated portion produces a change in density of a printed image in the negative development system, or a fog in the positive development system.

Countermeasures in the prior art against the deterioration of image quality involve improvements of the photoreceptive means itself and of ambient conditions, such as an extension of the service life of the photoreceptive means by improving its composition or structure, betterment of temperature characteristics of the photoreceptive means, and amelioration of ambient conditions (e.g., a cooling means is provided for maintaining the temperature of the photoreceptive means in a predetermined range).

As laser printers have become more compact yearly and their parts are densely assembled, it is difficult to overcome the deterioration of image quality by improving the photoreceptive means itself or ambient conditions.

SUMMARY OF THE INVENTION

The laser printer of this invention, which overcomes the above-discussed and numerous other disadvantages and deficiencies of the prior art, comprises a photoreceptive means, and a laser beam emitting device, said laser printer further comprises: a detecting means for detecting a factor of degradation of the image quality, said factor originating in said photoreceptive means; and a control means which controls the output level of said laser beam emitting device in accordance with the detected level of said factor.

In a preferred embodiment, the charger is formed in the vicinity of said photoreceptive means, a grid is formed between said charger and said photoreceptive means, said factor detected by said detecting means is the level of the grid current flowing through said grid.

In a preferred embodiment, the factor detected by said detecting means is the temperature of said photoreceptive means.

Thus, the invention described herein makes possible the objectives of (1) providing a laser printer which can compensate the degradation of the image quality attributable to a property of a photoreceptive means without improving a photoreceptive means or ambient conditions: (2) providing a laser printer which can be constructed in a reduced size: and (3) providing a laser printer which eliminates the necessity of using a photoreceptive means of high cost and can be manufactured at a low cost.

BRIEF DESCRIPTION OF THE DRAWINGS

This invention may be better understood and its numerous objects and advantages will become apparent to those skilled in the art by reference to the accompanying drawings as follows:

FIG. 3A shows the relation between the deterioration of the photoreceptive drum and the level of the grid current in the laser printer of FIG. 1.

FIG. 3B shows the relation between the deterioration of the photoreceptive drum and the potential of the laser-irradiated portion.

FIG. 3C shows the relation between the potential level of a laser-irradiated portion and the output level of the laser beam emitting device.

DESCRIPTION OF THE PREFERRED EMBODIMENTS

Figure 1:
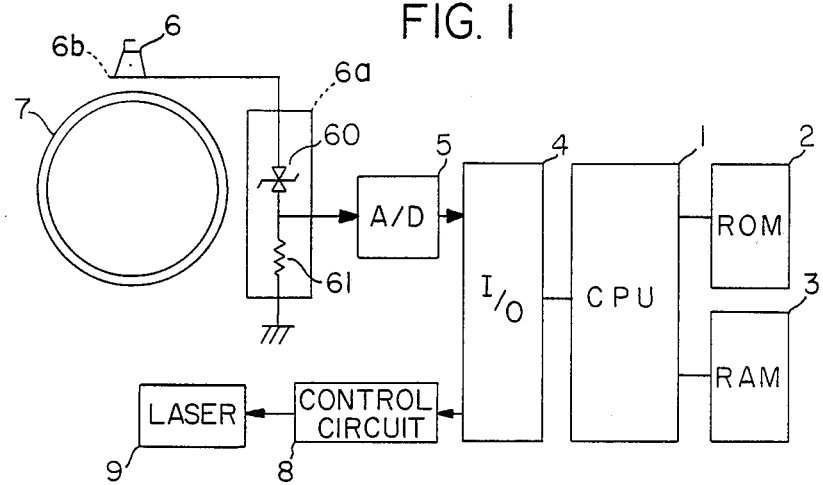
FIG. 1 is a block diagram illustrating the control of a laser printer of the invention.
Figure 2:
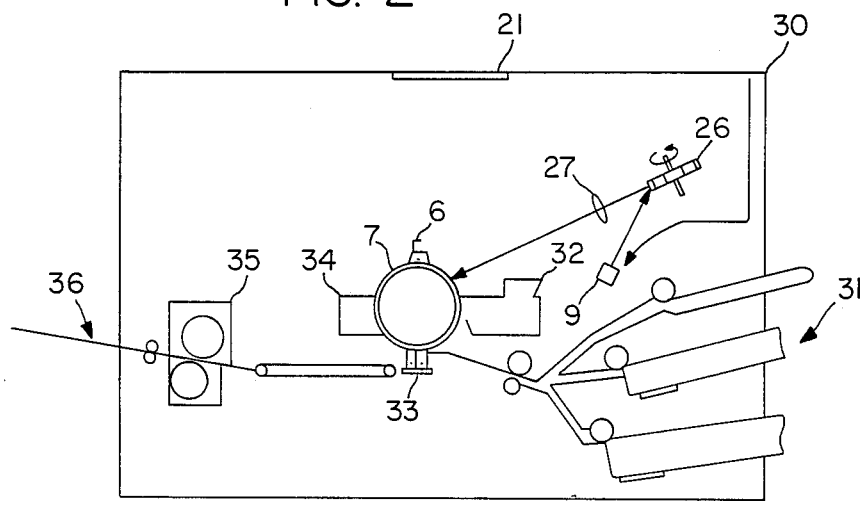
FIG. 2 shows a sectional view of the laser printer of FIG. 1.

FIG. 2 shows a laser printer according to the invention in which the deterioration of a photoreceptive means is detected as a change in the grid current of a charger (scorotron). The laser printer of FIG. 2 comprises a photoreceptive drum 7 disposed in the central portion of the main body 30. In the vicinity of the photoreceptive drum 7, a main charger 6, a developer 32, a transfer and separation charger 33, and a cleaning unit 34 are disposed. The main charger 6 is provided with a grid 6b (FIG. 1). A control unit 21 is mounted in the upper portion of the main body 30. Under the control unit 21, a polygon mirror 26, and fθ lens 27, and a laser beam emitting device 9 are disposed. Paper on which images are to be transferred is supplied from a paper cassette 31 to the charger 33, and conveyed to a paper exit 36 via a fixing device 35.

A laser beam emitted from the laser beam emitting device 9 is supplied to the photoreceptive drum 7 through the polygon mirror 26 and the lens 27, to scan the drum 7. Latent images are formed on the photoreceptive drum 7, and toner images are formed by the developer 32. The toner images are transferred to paper supplied from the paper cassette 31 and fixed to the paper by the fixing device 35.

FIG. 1 is a block diagram illustrating diagramatically the control of this laser printer. A grid current sensor 6a is connected to the grid 6b. The grid current sensor 6a comprises a series circuit of a varistor 60, which is a voltage-regulating element, and a resistor 61, which is a voltage-drop element. As shown in FIG. 1, the sensor 6a is connected to an A/D converter 5. The change of the grid current can be detected as the change of the voltage drop in the resistor 61. The voltage across the resistor 61 is supplied to a CPU 1 through the A/D converter 5 and an I/O port 4. A ROM 2 and RAM 3 are connected to the CPU 1. A laser output control circuit 8 is connected to the CPU 1 via the I/O port 4. The control circuit 8 controls the optical output level of the laser beam emitting device 9.

The output of the grid current sensor 6a is converted into digital signals by the A/D converter 5, and the digital signals are input to the CPU 1. The CPU 1 calculates the control level of the control circuit 8, in the manner which will be described below. The obtained control level is supplied to the control circuit 8. The control circuit 8 controls the optical output level of the laser beam emitting device 9, in accordance with the control level, resulting in that the photoreceptive drum 7 is scanned by a laser beam the level of which is increased so as to compensate the deterioration of the photoreceptive drum 7.

FIG. 3A shows the relation between the deterioration of the photoreceptive drum 7 and the level of the grid current. As shown in FIG. 3A, the grid current decreases with the progress of the deterioration of the photoreceptive drum 7. The relation of FIG. 3A has been previously obtained for each type of a laser printer, and stored in the ROM 2, in the form of a table. If the detected level of the grid current is lower than a prefixed value (e.g., 20 μA), the photoreceptive drum 7 is judged to be deteriorated (deteriorated state a), and the control of the optical output level of the laser beam emitting device 9 is commenced.

When the laser output level is not controlled, the potential of a laser-irradiated portion of the photoreceptive drum 7 at the deteriorated state a will be $V_{La}$ as shown in FIG. 3B which shows the previously-obtained relation between the deterioration of the photoreceptive drum 7 and the potential of the laser-irradiated portion. The relation of FIG. 3B is previously stored in the ROM 2. The potential of a portion irradiated by a laser beam when the photoreceptive drum 7 is not deteriorated (state a0) is $V_{L0}$. The CPU 1 calculates the potential difference $\Delta V_a = V_{L0} - V_{La}$. The potential difference $\Delta V_a$ is the value to be compensated in order to obtain the potential level which is the same as the potential level $V_{L0}$ (i.e., to obtain the image quality which is same as that obtained when the photoreceptive drum 7 is not deteriorated).

FIG. 3C shows the relation between the potential level of a laser-irradiated portion and the output level L of the laser beam emitting device 9. The greater the laser output level is, the lower the potential level is. When the photoreceptive drum 7 is at the normal state a0, the laser output level required for obtaining the potential level $V_{L0}$ is $L_{a0}$. The CPU 1 calculates the optical level $\Delta L_a$ to be increased for obtaining the potential level $V_{L0} + \Delta V_a$, and supplies a control signal corresponding to the level $L_{a0} + \Delta L_a$ of a laser beam, to the control circuit 8. In response to the control signal, the laser beam emitting device 9 generates a laser beam the level of which is $L_{a0} + \Delta L_a$, so that the potential of the laser-irradiated portion becomes $V_{L0}$, resulting in that the quality of the obtained image is the same as that obtained when the photoreceptive drum 7 is not deteriorated.

The relations shown in FIGS. 3A to 3C vary depending upon the type of a laser printer (more particularly, the type of the photoreceptive drum 7, the type of the laser beam emitting device 9, etc.). Therefore, these relations are previously obtained and stored in the ROM 2.

Figure 4:
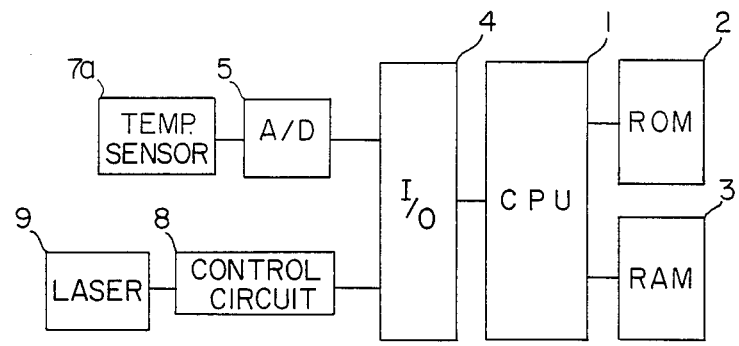
FIG. 4 shows a block diagram illustrating the control of another laser printer of the invention.

FIG. 4 illustrates another laser printer according to the invention. The laser printer of FIG. 4 is generally same in structure as the laser printer shown in FIGS. 1 and 2, but comprises a temperature sensor 7a instead of the grid current sensor 6a. The temperature sensor 7a may be mounted in the vicinity of the photoreceptive drum 7, or alternatively may be incorporated in the drum 7, so as to detects the temperature of the drum 7. The ROM 2 stores the relation between the temperature and the potential of a laser-irradiated portion (FIG. 5A) and also the relation between the potential level of a laser-irradiated portion and the output level of the laser beam emitting device 9 (FIG. 5B).

Figure 5A:
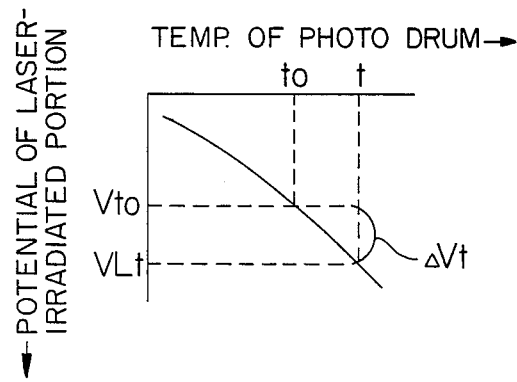
FIG. 5A shows the relation between the temperature and the deterioration of the photoreceptive drum.
Figure 5B:
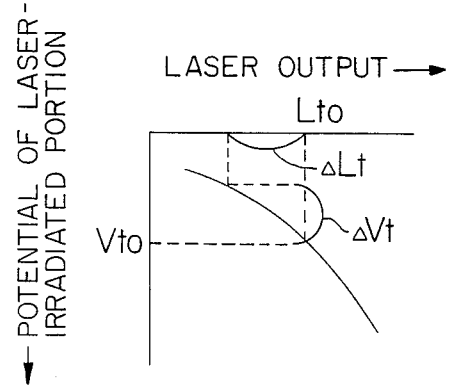
FIG. 5B shows the relation between the potential level of a laser-irradiated portion and the output level of the laser beam emitting device.

As shown in FIG. 5A, the higher the temperature of the photoreceptive drum, the lower the potential of a laser-irradiated portion. When the temperature of the phototsensitive drum is at the normal value t0 (i.e., at the condition in which degradation of the image quality does not occur), the potential of a laser-irradiated portion of the photoreceptive drum 7 is $V_{t0}$. When the laser output level is not controlled, the potential of a laser-irradiated portion of the photoreceptive drum 7 at a temperature t (which is higher than the normal temperature t0) will be $V_{Lt}$. The CPU 1 calculates the potential difference $\Delta V_t = V_{Lt} - V_{t0}$. The potential difference $\Delta V_t$ is the value to be compensated in order to obtain a potential level which is same as the potential level $V_{t0}$ (i.e., to obtain the image quality which is the same as that obtained when the temperature of the photoreceptive drum 7 is t0).

The CPU 1 calculates the optical level $\Delta L_t$ to be decreased for obtaining the potential level $V_{t0} - \Delta V_t$, and supplies a control signal corresponding to the level $L_{t0} - \Delta L_t$ of a laser beam, to the control circuit 8. In response to the control signal, the laser beam emitting device 9 generates a laser beam the level of which is $L_{t0} - \Delta L_t$, so that the potential of a laser-irradiated portion is $V_{L0}$, resulting in that the quality of the obtained image is the same as that obtained when the temperature of the photoreceptive drum 7 is t0. When the temperature of the photoreceptive drum 7 is lower than the normal value t0, the laser beam emitting device is controlled so as to increase the laser output level.

In the embodiments described above, the grid current and a temperature of the photoreceptive drum are detected as factors of degrading the image quality. The factor to be detected in the laser printer of the invention is not limited to these, and include others.

It is understood that various other modifications will be apparent to and can be readily made by those skilled in the art without departing from the scope and spirit of this invention. Accordingly, it is not intended that the scope of the claims appended hereto be limited to the description as set forth herein, but rather than the claims be construed as encompassing all the features of patentable novelty that reside in the present invention, including all features that would be treated as equivalents thereof by those skilled in the art to which this invention pertains.

What is claimed is:

1. In a laser printer comprising a photoreceptive means, and a laser beam emitting device, said laser printer further comprises a compensation means for compensating the degradation of the image quality originating in said photoreceptive means, said compensation means comprising: a detecting means for detecting a factor of the degradation of the image quality; and a control means which controls the output level of said laser beam emitting device in accordance with the detected level of said factor.

2. A laser printer according to claim 1, wherein a charger is formed in the vicinity of said photoreceptive means, a grid is formed between said charger and said photoreceptive means, said factor detected by said detecting means is the level of the grid current flowing through said grid.

3. A laser printer according to claim 1, wherein said factor detected by said detecting means is the temperature of said photoreceptive means.

* * * * *